Figure 1:
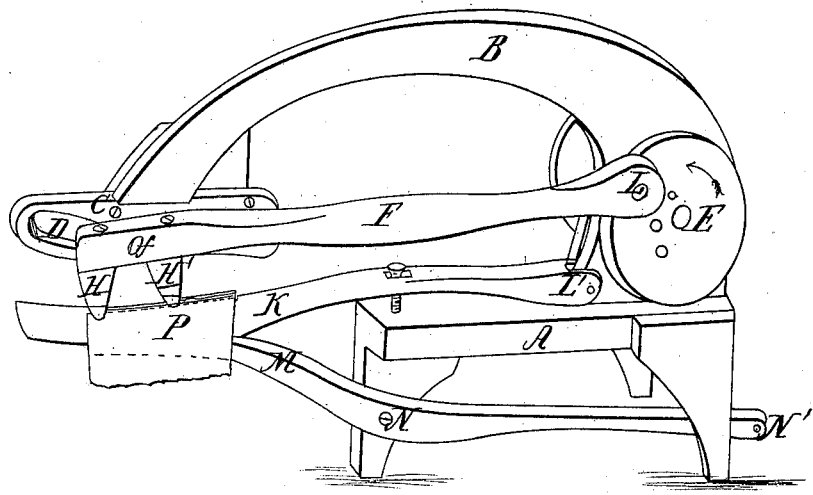
Figure 2:
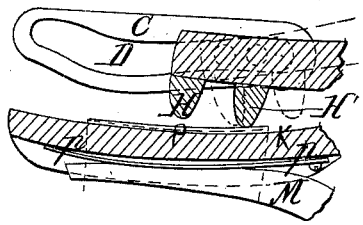
Figure 3:
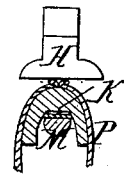

Nesmith & Smith.
Spool Attachment.
No. 94,800.    Patented Sept. 14, 1869.
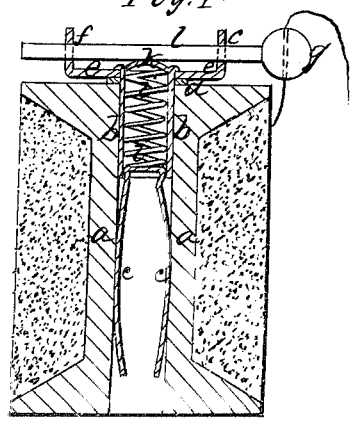
Fig. 1
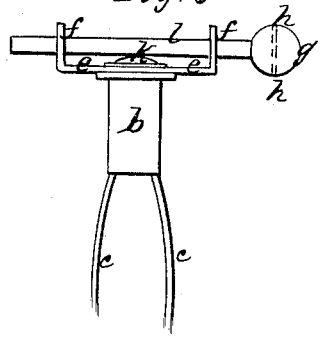
Fig. 3
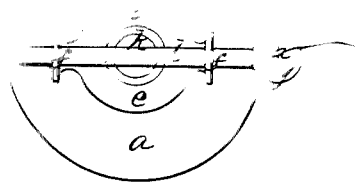
Witnesses.

J. E. Wiggin.
Boot and Shoe Mach.
No. 94,801. Patented Sep. 14, 1869.

Witnesses;
William Edson
Frank G. Parker

Inventor;
J. E. Wiggin